United States Patent
Kelley et al.

(10) Patent No.: US 6,641,050 B2
(45) Date of Patent: Nov. 4, 2003

(54) SECURE CREDIT CARD

(75) Inventors: Edward E. Kelley, Wappingers Falls, NY (US); Franco Motika, Hopewell Junction, NY (US); Paul V. Motika, Hopewell Junction, NY (US); Eric M. Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 09/992,930

(22) Filed: Nov. 6, 2001

(65) Prior Publication Data

US 2003/0085286 A1 May 8, 2003

(51) Int. Cl.⁷ .......................... G06K 19/06; G06K 5/00; G06K 7/01
(52) U.S. Cl. .................. 235/492; 235/380; 235/382; 235/382.5
(58) Field of Search ................ 235/380, 382, 235/382.5, 492, 375, 379

(56) References Cited

U.S. PATENT DOCUMENTS

| | | | |
|---|---|---|---|
| 3,641,499 A | 2/1972 | Housman | 340/149 |
| 4,004,089 A | 1/1977 | Richard et al. | 178/22 |
| 4,016,404 A | 4/1977 | Appleton | 235/61.7 |
| 4,507,550 A | 3/1985 | Fleer | 235/449 |
| 5,430,279 A | 7/1995 | Fernadez | 235/449 |
| 5,450,491 A * | 9/1995 | McNair | 713/184 |
| 5,478,994 A | 12/1995 | Rahman et al. | 235/380 |
| 5,544,111 A | 8/1996 | Berthozat et al. | 365/225.7 |
| 5,884,292 A | 3/1999 | Baker et al. | 705/403 |
| 5,910,989 A | 6/1999 | Naccache | 380/25 |
| 5,917,229 A | 6/1999 | Nathan et al. | 257/529 |
| 6,045,050 A * | 4/2000 | Ippolito et al. | 235/492 |
| 6,049,055 A | 4/2000 | Fannash et al. | 219/121.66 |
| 6,064,428 A | 5/2000 | Trosino et al. | 348/128 |
| 6,299,069 B1 * | 10/2001 | Shona | 235/492 |

FOREIGN PATENT DOCUMENTS

| | | |
|---|---|---|
| EP | 624839 A1 | 11/1994 |
| WO | WO 97/22091 | 6/1997 |

OTHER PUBLICATIONS

P. Lee, Encoded Magnetic Stripe Detector with Decision Window, Mar. 10, 1978, pp. 4091 & 4092.

* cited by examiner

Primary Examiner—Karl D. Frech
Assistant Examiner—April A. Nowlin
(74) Attorney, Agent, or Firm—Whitham, Curtis & Christofferson, P.C.; Jay H. Anderson

(57) ABSTRACT

Credit card or portable identification cards containing smart card technology and electronic fuse (e-fuse) technology are combined with an LFSR pseudo random number generator to provide a secured method to prevent fraud and unauthorized use. Secure personalization via e-fuses, a pseudo-random number generator linear feedback shift register, free running clock oscillator, and power source embedded in the card provide a highly secured method to render a lost or stolen card useless. A unique card ID is permanently encoded within the card which requires a specific activation code to activate the card. A PIN number permits the card owner to activate the card for a predetermined length of time while processing a transaction. The card dynamically generates random code sequences and synchronization keys to secure a transaction.

11 Claims, 13 Drawing Sheets

SECURE CREDIT CARD

BACKGROUND OF THE INVENTION

1. Field of the Invention

The present invention generally relates to credit cards and debit cards and, more particularly, to secured credit cards, secured debit cards, or secured access control cards that provide protection against unauthorized use.

2. Background Description

The widespread availability and convenient use of credit and debit cards for general financial transactions have proliferated the number of these plastic cards or financial instruments throughout the world. Along with the benefits and ease of use, these inexpensive and readily available cards are highly susceptible to unauthorized use and theft. Security depends on maintaining personal possession of the cards and minimizing access to the account numbers as much as possible. Additionally, credit card theft is further complicated by the generation and falsification of these cards with illegally obtained personal identification numbers. Easy and reliable means to validate that the card is authentic does not exist.

Attempts to detect forged or altered credit cards have involved placing magnetic strips, codes, or similar means on the card. These schemes have not prevented thieves from either deciphering the codes or alternatively forging a new credit card.

The losses associated with the unauthorized use of these cards can have dramatic effects on the card user and the financial institutions providing these services. Although credit card insurance coverage relieves the effects of the immediate losses resulting from the theft, the overall loss to the individual and financial industry has been enormous and is increasing steadily. Confidence in these cards is being seriously eroded.

This problem can be further extended to a broader set of portable identification cards, badges, and access instruments. In the case whereby the card is used as an access control device, a commonplace incident of a lost badge can gain the finder unauthorized access to a secured area causing potentially undesirable consequences.

SUMMARY OF THE INVENTION

It is therefore an object of the invention to provide a means to secure credit cards or related instruments such as identification cards, badges, and access instruments.

It is another object of the invention to provide a means whereby the card or related instrument becomes useless or inoperable if lost or stolen.

It is yet another object of the invention to require an access code to activate and use the said card or instrument.

Further, it is another object of the invention to have all the security encoding contained entirely within the card in a manner where it cannot be transmitted to, or read from, outside the card.

According to the invention, there is provided a new means and method to encode a security function within a smart card credit card body. A smart card credit card incorporates integrated electronics within it so that basic processing of information and transmission of information to and from the card may occur. In addition, this invention also uses two linear feedback shift registers (LFSR) known as a reference LFSR and the secure LFSR. These LFSRs are synchronized by common free running clock oscillator. The secure LFSR is customized to a unique configuration for each secure credit card. This combination of LFSRs is the key to generating a pseudo random binary string that is used to encrypt information. The generated binary string is a very large sequence sufficient for effective randomness. It is the state of the LFSRs, i.e., the binary sequences generated from the LFSRs and the card id, that is transmitted to the issuing financial institution during a transaction whereby the institution can validate the authenticity of the card and the transaction. It is the configuration of the secure LFSR that gives the special uniqueness to each secure credit card. This configuration is very difficult, perhaps impossible for thieves to replicate as it cannot be read from the card itself. None of the memory configurations can be read or obtained from outside the secure card.

Unique LFSR configurations are accomplished by employing e-fuse technology within the card. e-fuse technology permits special memory arrangements to be created when the card is manufactured or when the card is issued. E-fuse technology uses writeable integrated fuses that can be "burned" after the card is assembled which in turn provides the unique configurations of the LFSRs and the card id. There is a personalized identification number (PIN number) also burned into the card which the user must enter to activate the secure card during each transaction.

The institution that issues the card must maintain a record of every card configuration. Whenever a secure credit card is involved in a transaction, the card id permits the financial institution to retrieve the configuration data for the secure card involved in the transaction. From this configuration information, and the pseudo random number string returned from the secure credit card at the time of the transaction, the card and transaction can be authenticated.

When a user wants to use the secure card, a PIN number must be entered directly into the card. If the PIN matches the PIN burned on the card, the secure credit card is activated and a pseudo random sequence is generated which is communicated to the financial institution authenticating the transaction.

It is the nature of the invention that makes it unlikely that no two transactions of a secure card will have the same pseudo random number sequences communicated outside the card.

This concept can be applied to other devices such as badges and access control devices which require secure authentication of the card.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
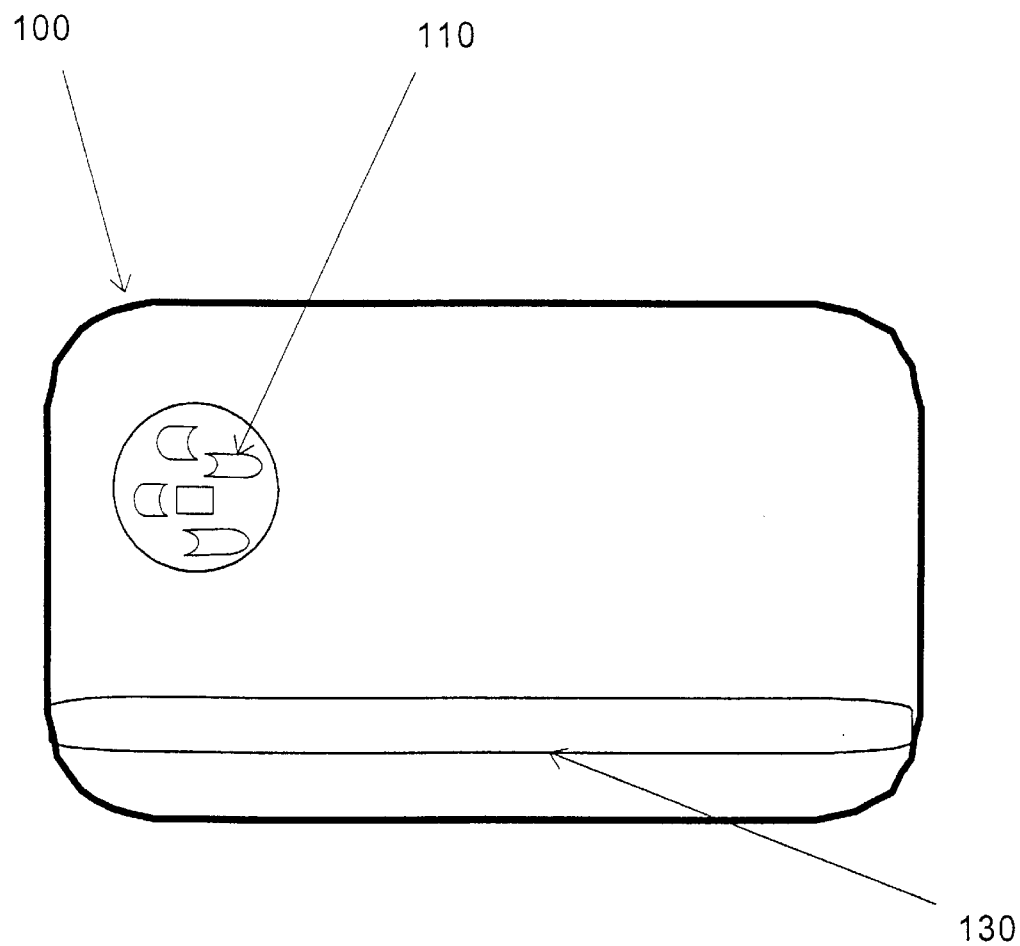
FIG. 1A is a diagram of a basic smart card with an embedded semiconductor chip.
Figure 1B:
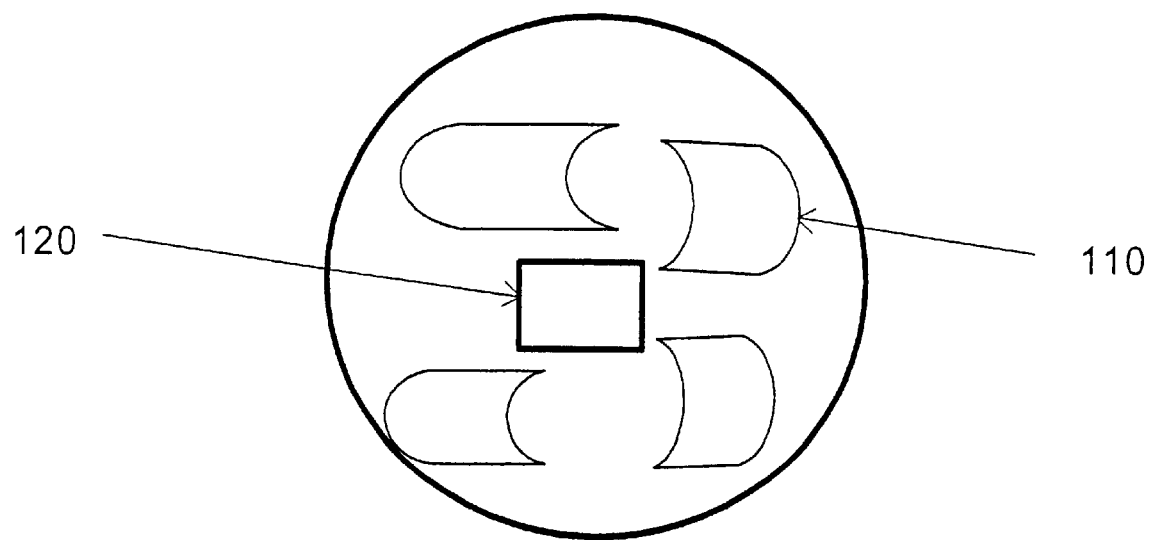
FIG. 1B is an enlarged view of the chip showing chip contacts.
Figure 2:
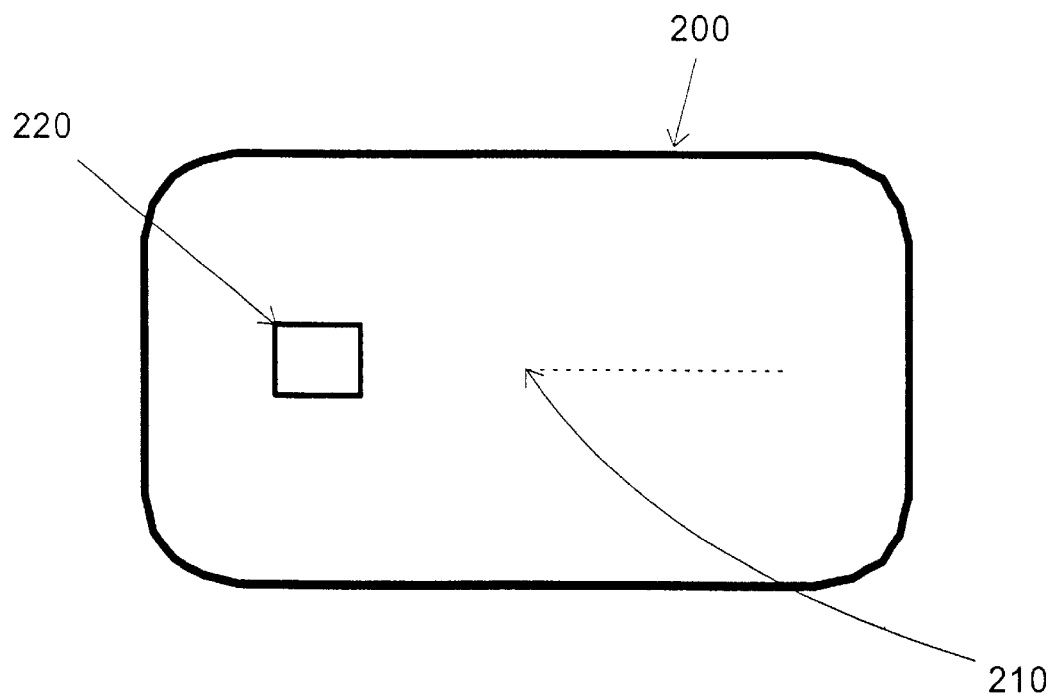
FIG. 2 is a diagram of a basic smart card with an embedded semiconductor chip without contacts.

The industry ISO 7810 international standard defines the design parameters of a typical smart card. These standards include the size of the card, the communication interface and protocol, the electronic contacts specifications (if required), plastic characteristics (e.g., temperature range, flexibility, etc.), and other specifications. There are currently two general types of smart cards available, a contact and a contact-less smart card package. Referring to FIGS. 1A and 1B, the contact smart card 100 has a set of gold plated electrical contacts 110 on the front of the card. These contacts are used to interface to the chip 120 when the card is inserted into a smart card reader and replace the need for the magnetic strip 130. Referring to FIG. 2, the contact-less smart card 200 utilizes a built-in antenna 210 that interfaces the chip 220 with the external environment. When the card is swiped near an external transmitter/receiver antenna, it electromagnetically couples the chip to the external transceiver and transfers the desired data to and from the chip.

In the practice of the present invention, several existing technologies and new techniques are combined to provide for the secured nature of the card. The invention makes use of a smart card package and utilizes electronic fuses (or e-fuse) methodology and linear feedback shift register (LFSR) concepts to create randomly generated security codes. This provides personalized card identification uniquely encoded during the card manufacturing process and, thereafter, cannot be replicated. The smart card is similar in size to a conventional magnetic strip plastic card with the addition of an electronic chip integrated within the card. This similarity makes the smart card easily compatible with existing cards and convenient to use. The chip may consist of logic and memory to process and store electronic data. The chip can also be used to support interfacing with the user and external communication links.

The LFSR concept provides the mechanism to securely encode the identity of the secured card. The LFSR coupled with a free running clock is the source of the pseudo random number generation which permits the encoding of the information essential to credit card transaction. The e-fuse technology is a technique that permits permanent burning of essential and non-alterable information as a type of read-only memory during card manufacturing or during an initial card configuration by the financial institution. It is this means whereby the encoding technique is kept on the card and cannot be read or replicated.

Although the LFSR has many uses in testing, communication, and encryption applications, our intent here is to use the LFSR as a source of pseudo random binary sequences. The LFSR is a special configuration of a "logic linear circuit" into a special form of shift register or counter. This circuit requires only a clock input, making them autonomous, and comprises three basic logic components:

1. Latch or D-type flip-flop or a unit delay.
2. Exclusive-OR (XOR) or modulo-2 adder.
3. Modulo-2 scalar multiplier.

Figure 3A:
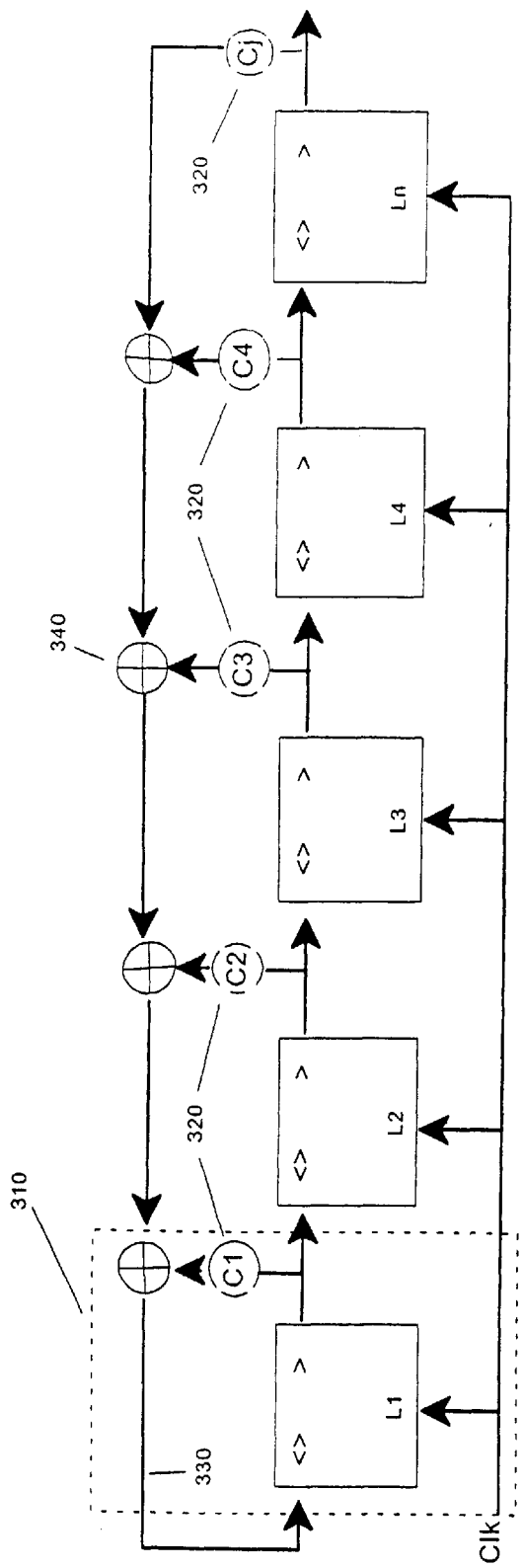
FIGS. 3A and 3B are block diagrams illustrating two configurations of a linear feedback shift register.
Figure 3B:
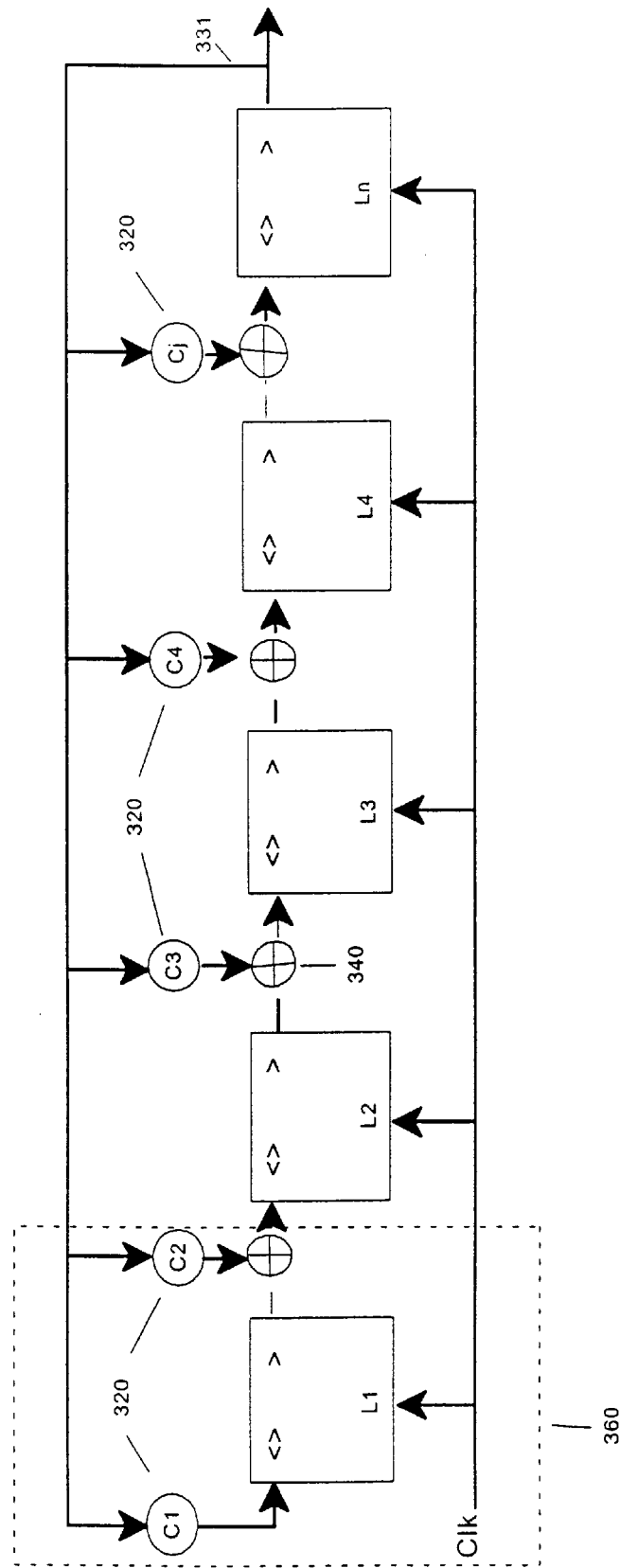

The LFSR circuit can take either of two equivalent or dual forms. FIG. 3A depicts the "standard" form and FIG. 3B depicts the "modular" form of a generic LFSR. Each cell in each type 310 and 360 has the same structure and is replicated for the desired length n of the LFSR. The modulo-2 scalar multiplier ($C_j$) 320 is either 0 or 1, which results in a connection or no-connection for the feedback signal 330 and 331. The modulo-2 adder 340 is equivalent to an exclusive-OR logic circuit. The truth table for a modulo-2 adder and a simple example of an LFSR is shown in the following table.

| Modulo-2 Add & Subtract Truth Table | | |
|---|---|---|
| +/− | 0 | 1 |
| 0 | 0 | 1 |
| 1 | 1 | 0 |

Some of the characteristics of an LFSR are its length or number of cells (n), the feedback configuration or values of and the initial state $C_0$ of the circuit. A "maximal length" LFSR is a circuit that cycles through $2^n-1$ unique states when initialized with a non-zero value. Of course, the maximum number of states of an n length shift register is $2^n$, so a maximal length LFSR cycles through all the possible states except when it is initialized to zero. A non-maximal length LFSR also cycles through a subset of $2^n$ states depending on the initial seed or initial value and feedback configuration. For the purpose of our concept's effectiveness, we will consider only maximal length LFSR implementations.

Figure 4A:
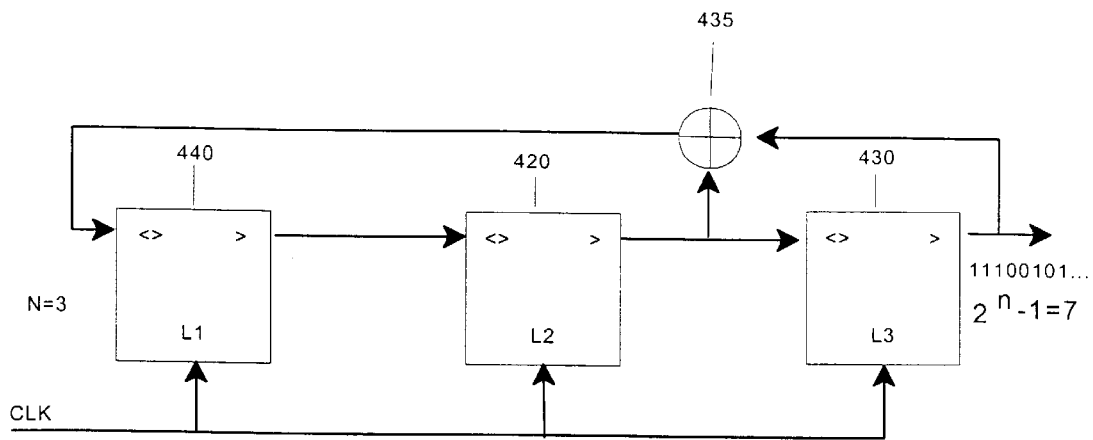
FIG. 4A is a logic diagram and FIG. 4B is a state diagram together illustrating an example of a linear feedback shift register.

The example in FIG. 4A shows a simple three stage (n=3) maximal length configured LFSR. In this case the outputs from latches 420 and 430, $L_2$ and $L_3$, are exclusive ORed in 435 and fed back to latch 440, $L_1$. The state table below shows the state of each of the latches.

|  | $L_1$ | $L_2$ | $L_3$ |
|---|---|---|---|
| $S_0$ | 1 | 1 | 1 |
| $S_1$ | 0 | 1 | 1 |
| $S_2$ | 0 | 0 | 1 |
| $S_3$ | 1 | 0 | 0 |
| $S_4$ | 0 | 1 | 0 |
| $S_5$ | 1 | 0 | 1 |
| $S_6$ | 1 | 1 | 0 |
| $S_0$ | 1 | 1 | 1 |

Figure 4B:
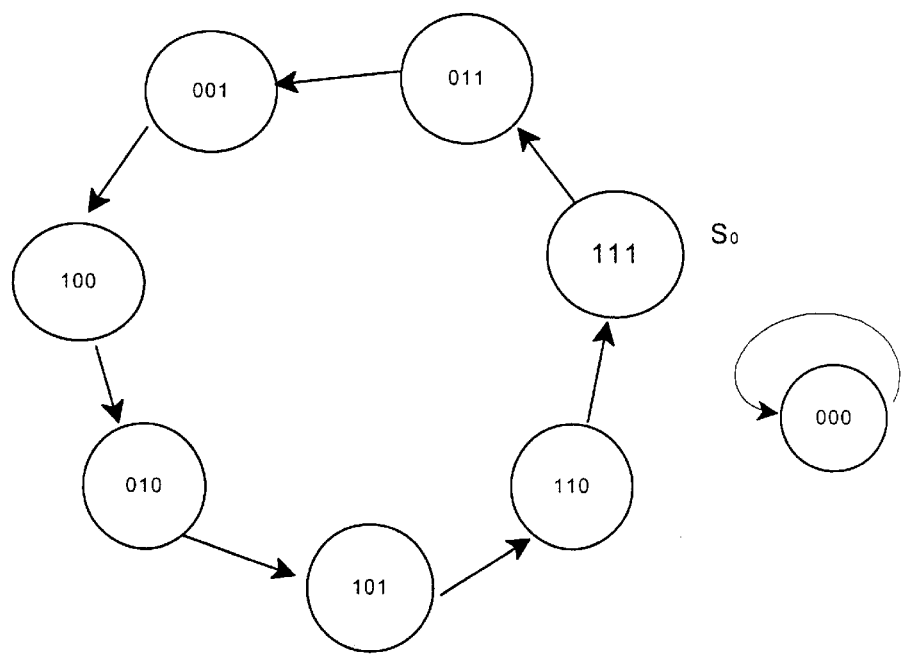

FIG. 4B shows the sequence of states that this LFSR cycles through after being initialized to all binary ones at state $S_0$. The binary output sequence for this example is seven bits "11100101", before it starts repeating. One can easily extend the length of this simple circuit to provide long sequences of binary pseudo random numbers. For example, a 32-bit maximal length LFSR can cycle for more than four billion states before repeating. Furthermore, by selecting the appropriate feedback parameters for the LFSR, one can generate unique sequences for each configuration. Maximal configuration tables for many values of n are readily available in many references or can be easily generated. Additional detail information on linear automata can be found in textbooks by S. W. Golomb (Shift Register Sequences. Aegean Park Press. 1978) and W. Wesley Peterson and E. J. Weldon (Error Correcting Codes. M.I.T. Press. 1972).

There are several techniques and circuits used for implementing chip built-in fuses. These integrated fuses can be personalized at a proper step in the manufacturing or test process and can be utilized in several ways to improve the performance, yield, and traceability of the product.

One potential use for these fuses may be to repair defective sections of the chip by logically reconfiguring or replacing defective sections of the chip, thereby increasing the effective yields. This is common in large array or memory structures where a single defective memory cell can render the chip unusable. By designing memory array structures with redundant word and/or bit lines, and by providing "writeable" fuses for these redundant lines, one can easily swap the defective line (or multiple lines) and reconfigure the array to be fully functional. This fuse repair action can have significant yield impacts throughout the product cycle.

Another use of integrated fuses is to enhance product traceability from chip test to field system usage. Each chip can be personalized with a unique chip identification (chip-id) early in the semiconductor foundry manufacturing process. This chip-id usually consists of the wafer lot, wafer-id, and chip x-y coordinates on the wafer, allowing for individual chip traceability throughout the products life span. There are several other uses for integrated fuses such as performance enhancements, product sorting, custom function tailoring or reconfiguration, encryption, and system security.

A typical fuse consists of a narrow and short metal strips or "shorts" that can be "opened" or "burned" when being written. These fuse metal strips are usually located on the periphery of the chip near the surface where they can be easily located and burned with minimal impact to the active area of the chip. The key parameters associated with integrated fuses are that they should be "writeable" or "burnable," have minimal impact on system performance and power, be highly reliable, require relatively small silicon real estate area, and have a simple read and write interfaces.

Two common types of integrated fuses in use in today's Very Large Scale Integrated (VLSI) circuits are similar in function, but differ in the personalization methodology. The first type utilizes an external laser to cut or burn the desired fuse. This method has been used for many years and shown to be highly reliable, but requires additional processing steps and special equipment. The second type is based on applying a relatively large electric current pulse to blow the fuse. The advantage of the second type is that the fuses can be blown any time without the need for special equipment, but the fuse write-support circuit must provide the function and drive necessary to blow these fuses. The proposed credit card security concept is preferably based on this second type of electronic fuse (e-fuse) that allows chip personalization after the device package or card has been assembled and is operational.

This invention combines the smart card package, electronic fuse support, and a software security process to personalize each card to a unique activation and a pseudo random security code. The generation of the security code is based on a customized LFSR configuration and random cycle count. This combination of the e-fuses and the LFSRs provides a unique type of read only memory. The proposed secure card solution renders the card useless and worthless unless the proper activation code is provided. This prevents unauthorized use of the card if lost or stolen, since the card automatically powers down after a few minutes. Specifically, the activation code or pin number provides a means for the card owner to activate the card for a pre-defined length of time while processing the transaction. Once activated, the security generation function is used to dynamically generate unique pseudo random code sequences and synchronization keys to ensure a secure transaction with the financial institution. The on-chip personalization of the unique activation and security generation codes is accomplished by using integrated e-fuses and blowing these fuses when the card is issued by the financial institution.

The implementation of the card security utilizes one or more of the following concepts and features:

1. Temporarily activated by entering unique activation code.
2. Automatically shuts off or disables itself after a few minutes.
3. Personalized activation code, card ID #, and LFSR configurations.
4. Incorporates an active IC chip with security functions.
5. "Touch" key(s) to enter activation code and enable card.
6. Key entry and status display.
7. Optional compatibility with a magnetic strip interface.
8. Several power source options.

The concept is further based on a software support package at the receiving end in a financial institution or other institution using the secure card concept. This support would incorporate a synchronized security verification algorithm, account data base access interface, and a transaction processing function. The overall high-level exemplary secure card process and financial institution transaction support are shown as flow charts in FIGS. 9A and 9B.

Figure 9A:
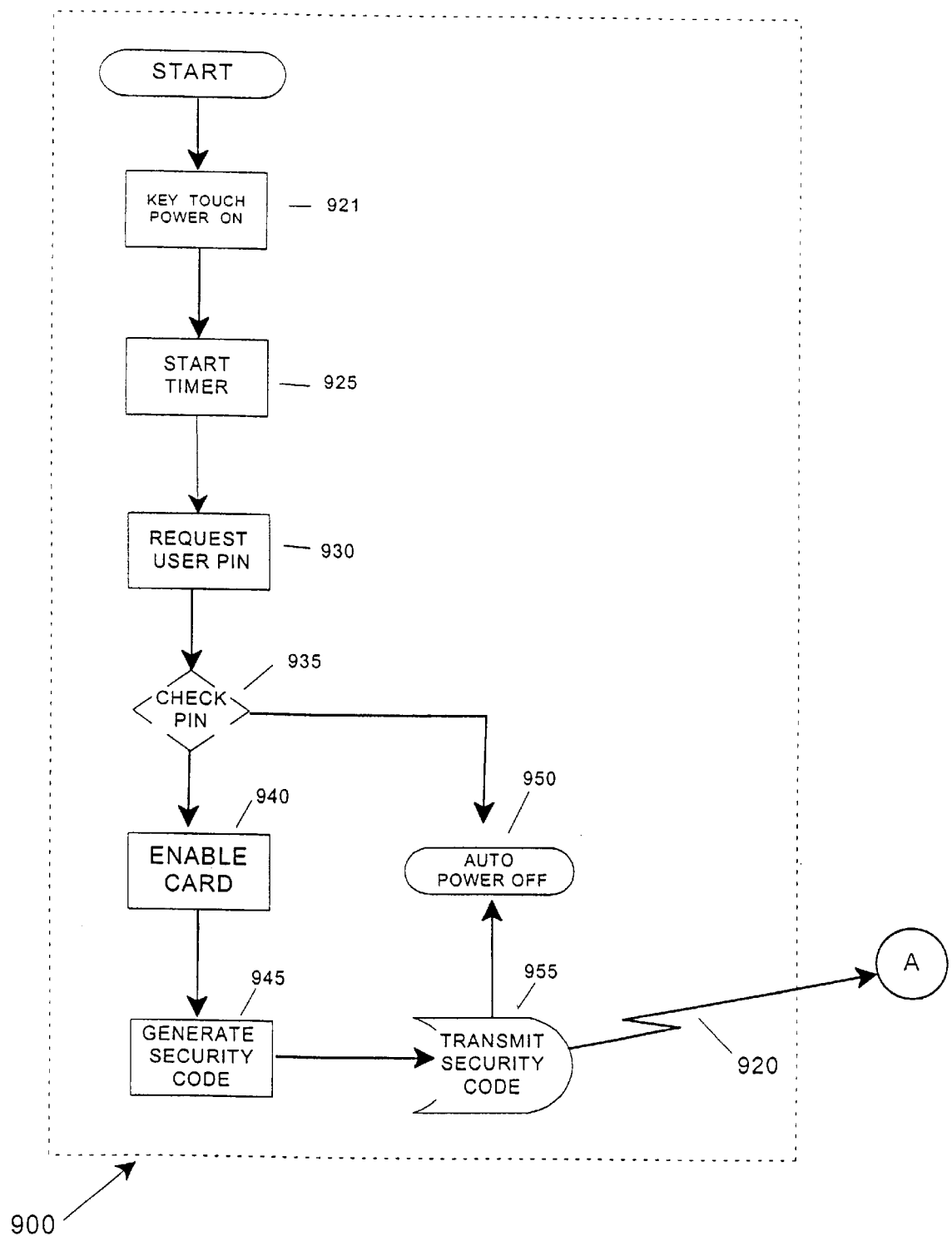
FIGS. 9A and 9B are flow diagrams of a secure process implemented by the invention.
Figure 9B:
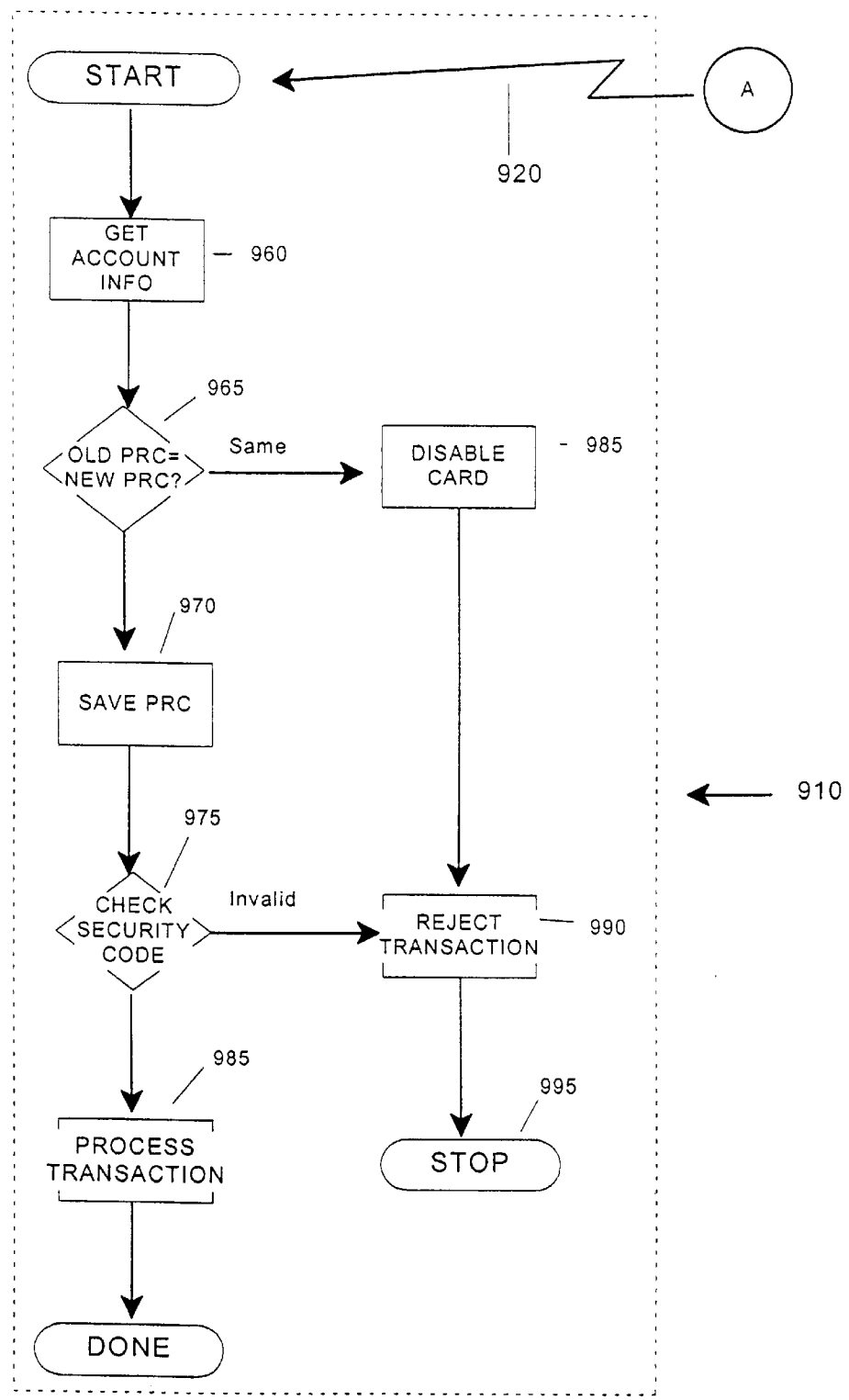

Referring now to FIGS. 9A and 9B, the secure transaction process combines several functions performed at the card sending end 900 and at the financial institution's receiving end 910. As described above, the main function at the card end is to prevent unauthorized access to the card and to generate a secure identification code. Referring to FIG. 9A, the secure card user initiates a transaction by touching a key on the secure card shown at function block 921. This action powers on the card and continues with starting the internal clocks and timer to begin the random number generation process at function block 925. Next the user is prompted to enter the PIN associated with the card at function block 930. This input is checked for correctness at decision step 935. If the PIN is incorrect, the secure card will automatically power off at terminal function step 950. This sequence can be repeated at function block 921 for another transaction attempt. An alternate sequence (not shown) would allow for several attempts for the user to enter the PIN in the case whereby the user simply makes an error in the PIN entry. If the PIN is correct, the card is fully enabled to generate the security code associated with this transaction at function block 945. This security code is then continuously transmitted, illustrated at 920, to the receiving institution end shown as 910. The secure card will automatically power down after a pre-programmed time duration shown at terminal function step 950. A user of the secured card may power down the card manually at any time (not shown). The complementing functions at the receiving end 910 are to first verify or authenticate the identification code and then to process the requested transaction. The receiving end first detects an incoming transmission, illustrated as 920, indicative of a request for a transaction authentication. The resulting security code contained in transmission 920 is composed of the LFSR states (i.e., counts) along with the card id. The transmission 920 could employ different transport mediums including RF, or computer transport mechanisms including the Internet. Referring to FIG. 9B, the first action at the receiving end is to locate the account records at function block 960 associated with the card id as received in the transmission 920. Using the pseudo random code (PRC) which came from the secure LFSR, and the synchronizing random code (SRC) (cycle count) which came from the reference LFSR, and the card id, one can uniquely authenticate the transaction. As a special security measure against fraud, the PRC portion of the security code is checked to see if it was the same as the last transaction as checked by decision step 965. If it is the same, it is indicative of a fraudulent transaction attempt and the card is disabled at function block 985 from performing further transactions at the receiving end. Next, the new PRC is saved for the next future transaction at function block 970. If the authentication step indicates an improper security code for this card the transaction is rejected at function block 990 and the transaction is aborted at terminal step 995. Otherwise the transaction is approved if the account is permitted this transaction per financial institution policy and notification is sent to the vendor involved (not shown).

This security code verification process is dependant upon the receiving end or card issuing agency knowing the unique configuration of the secure LFSR and card ID issued to an individual. Alternatively, knowledge of the cycle count of the synchronizing or reference LFSR along with knowledge of the secure LFSR configuration and card id one can easily project or simulate the expected value of the pseudo random code.

Of course, if the verification process encounters an intentional breach of security, the specific credit card can be immediately disabled and a security warning issued or other action taken as desired by the secure card issuing agency. In a less severe case where an invalid security code is received due to possible transmission errors, the incident can be logged and tracked without immediately disabling the card. Once the identification code has been verified, the financial institution can continue processing the remainder of the transaction in the usual fashion.

Figure 5:
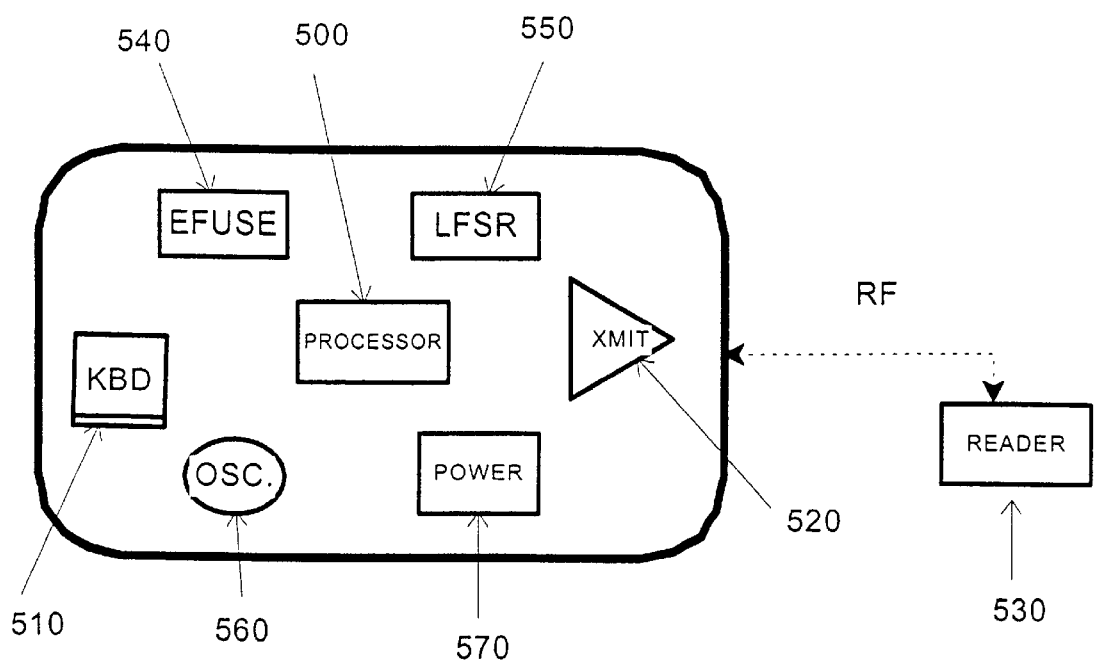
FIG. 5 is a functional block diagram showing a secure card.

A functional diagram of the secure card with associated sub-components is shown in FIG. 5. The secure card includes the main processor or controller chip 500, one or more touch-sensitive numeric key pads 510, radio frequency (RF) or magnetic external coupling 520 and 530, an integrated personalization e-fuse 540, pseudo random code generation LFSR 550, a free running clock oscillator 560, and a power source 570.

Figure 6A:
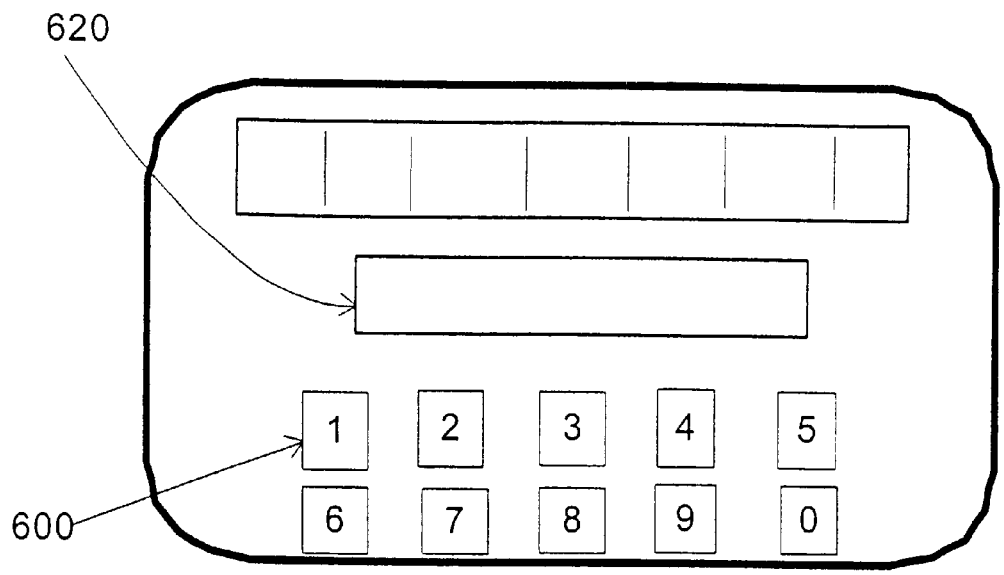
FIGS. 6A, 6B, 6C and 6D are diagrams showing several forms the secure card of FIG. 5 can take.

Referring now to FIGS. 6A, 6B, 6C and 6D, the physical secure card can take one of several alternative forms. The card shown in FIG. 6A has multiple digit key pad input 600, and an multiple character display 620 which works in conjunction with the input key pad. Since each card is personalized with a unique activation code at the time of issuance, the user must input this code to enable the card before usage. The input key pad's main functions are to first power-on the dormant card by touching any of the key pads and second to provide a means to enter the activation code or PIN. The key pad may consist of either 0–9 numeric keys 600 as shown in FIG. 6A or a single "dynamic" key 610 as in FIG. 6C. Additional special keys (not shown) may be provided for alternate functions and future input extensions. These pads can be standard "touch-sensitive" capacitive keys.

Figure 6B:
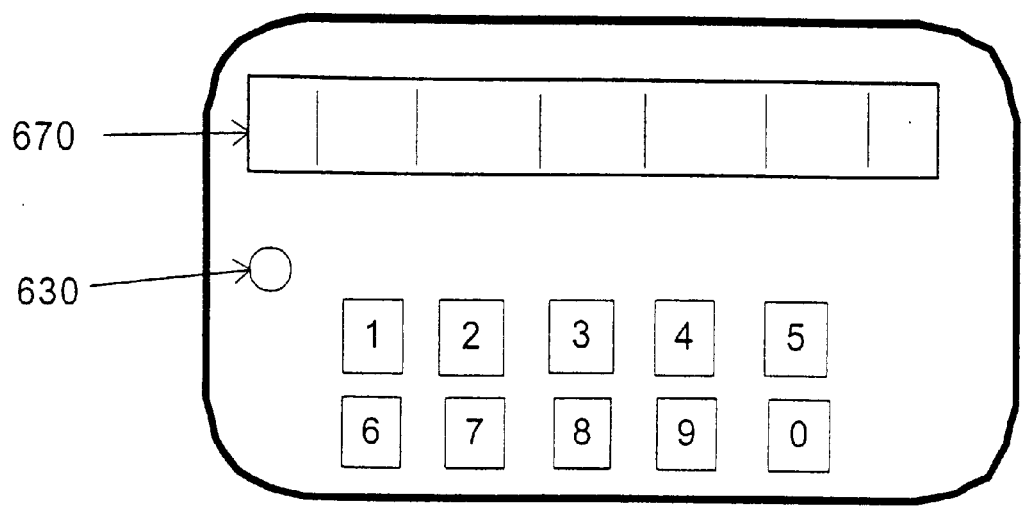

The character displays array 620 shown in FIG. 6A is intended to work in conjunction with the input key pad 600 and to provide card status information. The display function can be simplified by a single "enabled" status indicator 630 as shown in FIG. 6B. This status indicator would confirm the entry of the correct activation code from the key pad. The display array may be implemented with liquid crystal elements or even LEDs if sufficient power is available.

Figure 6C:
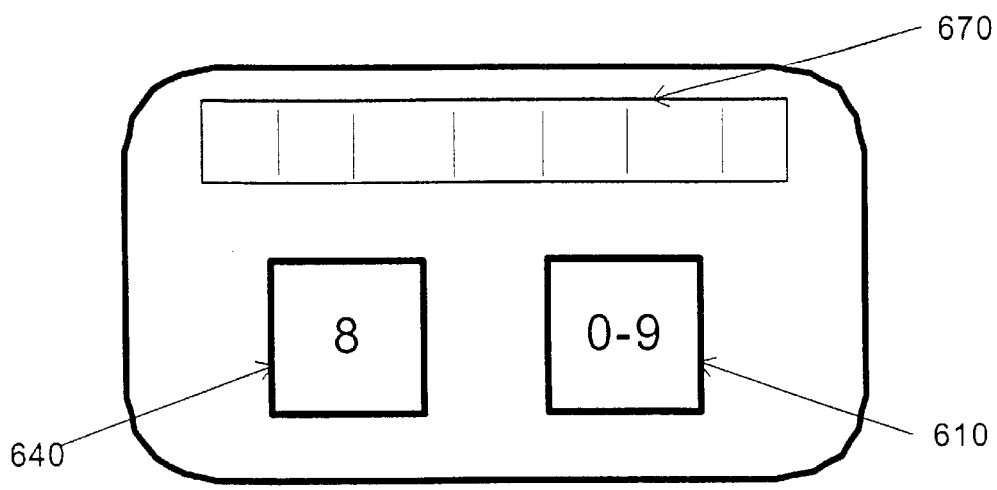
Figure 6D:
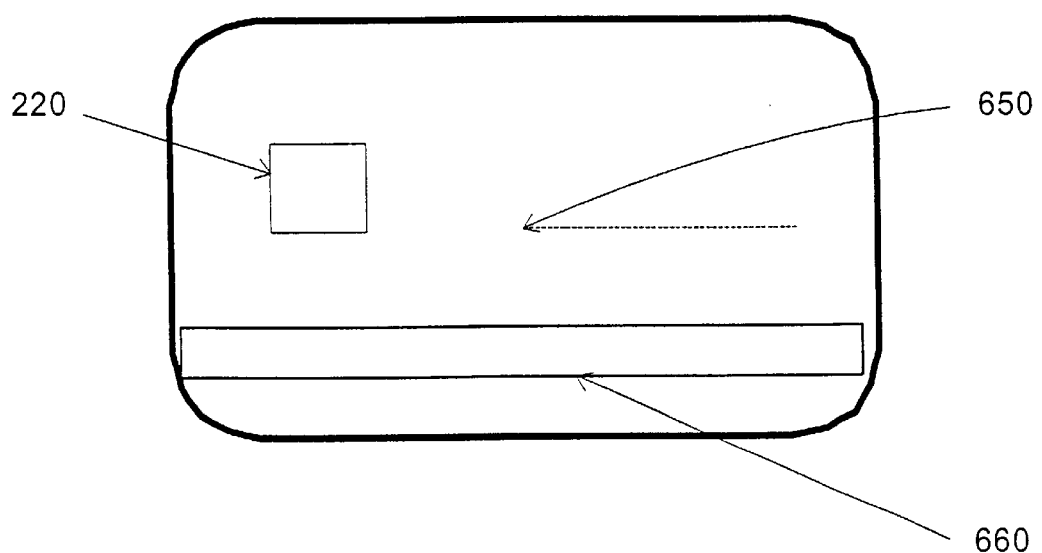

The single key pad 610 and single character display 640 shown in FIG. 6C is intended to simplify the above hardware while still supporting the required input function. This is accomplished by dynamically cycling the display through a predefined character set. The cycling time would include a momentary delay to allow the user to depress the single key pad when the desired character is displayed. This input sequence is repeated until all the characters in their proper sequence are selected sequentially one at a time, such as the activation code character sequence. Once the activation code matches the internal personalization code, the display indicates the card status as enabled. Although we have described several simpler input and display options, the extended key pad and display array could potentially support card applications that support complex transactions in the future.

Figure 7:
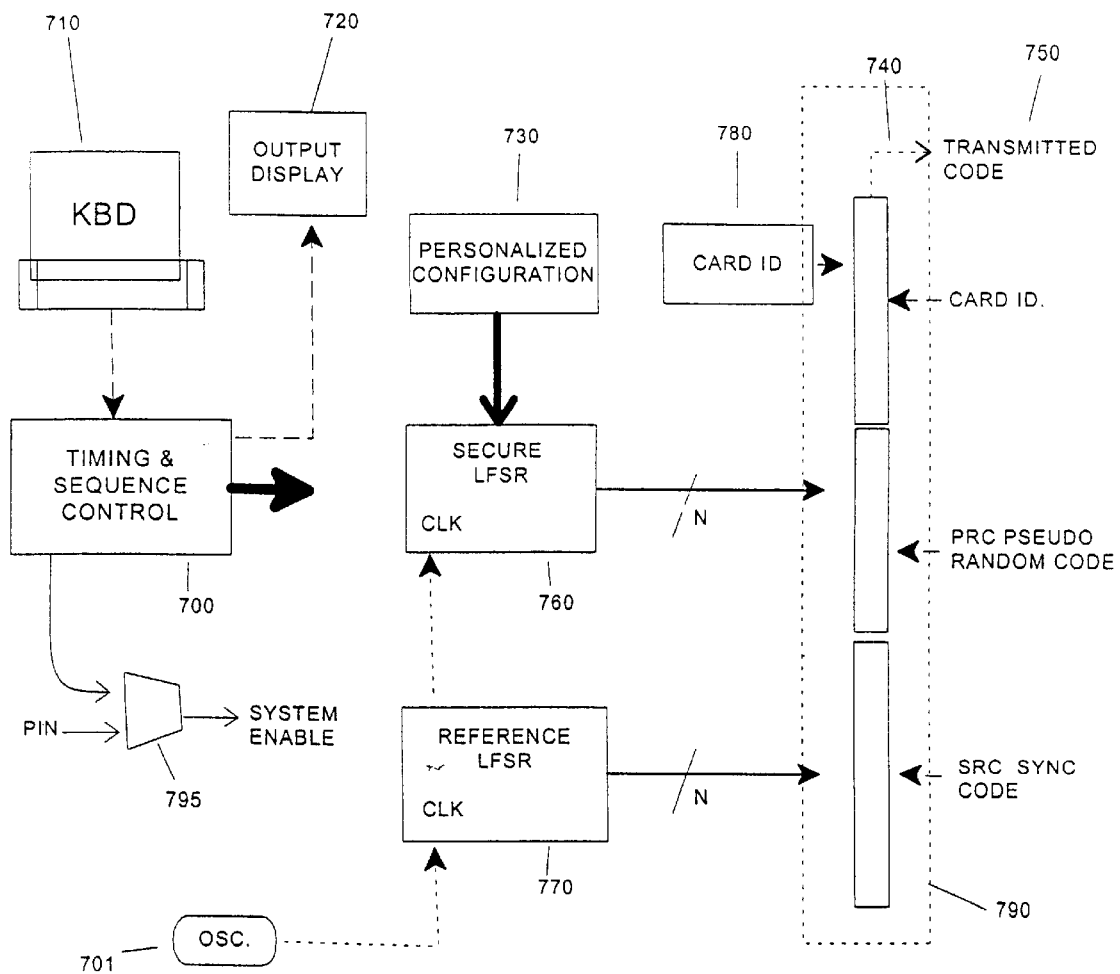
FIG. 7 is a block diagram illustrating a secure code structure for use in the secure card.

The sequencing and control of the card functions are performed by an embedded VLSI chip. The chip could be a relatively simple and low power microprocessor chip 500 with integrated microcode and basic I/O interface as shown in FIG. 5. The processor would be designed and programmed to support the following functions as shown in FIG. 7. These include timing and sequence control 700 and 701, key pad input processing, 710, output display control 720, access code validation within the processor (not shown), security code generation 740, and external communication protocol and driver (RF or magnetic) 750. The processor would be able to control the power sequencing for the card as needed (not shown). The microprocessor chip could be capable of supporting much more complex functions but this depends greatly on the individual chip design.

The external communication (and power) is based on a contact or contact-less interface as described in the smart card background section and shown in FIGS. 1 and 2. The contact method depends on the smart card reader to provide the mechanical contacts and electrical signal and power to the contacting area of the card. This method is somewhat simpler than the contact-less method since it does not require special electromagnetic communication support and can provide ample computing and power capacity from the card reader.

Alternatively, the contact-less method is based on a more autonomous wireless architecture. There are two approaches for the contact-less communication interface. The first interface is based on establishing a radio frequency (RF) communication link between the card and the card reader, not shown. The card would have an imbedded antenna 650 per FIG. 6D connected to the chip's RF output driver, while the card reader would also have a similar antenna to receive the card signals. The RF power to support the communication would be extremely low since the card and reader could be placed in close physical proximity and the RF transmission burst would be of very short duration.

The second contact-less communication approach is based on establishing a magnetic interface to the card reader. In this approach a magnetic transducer 660 embedded in the card per FIG. 6D emulates the magnetic strip signal similar to conventional magnetic strip cards. Although somewhat more difficult to implement, this approach had the benefit of compatibility to existing widely available card readers. Combining both approached could provide a means for a smooth seamless transition from current magnetic strip cards to fully autonomous and secure wireless smart cards.

Figure 8:
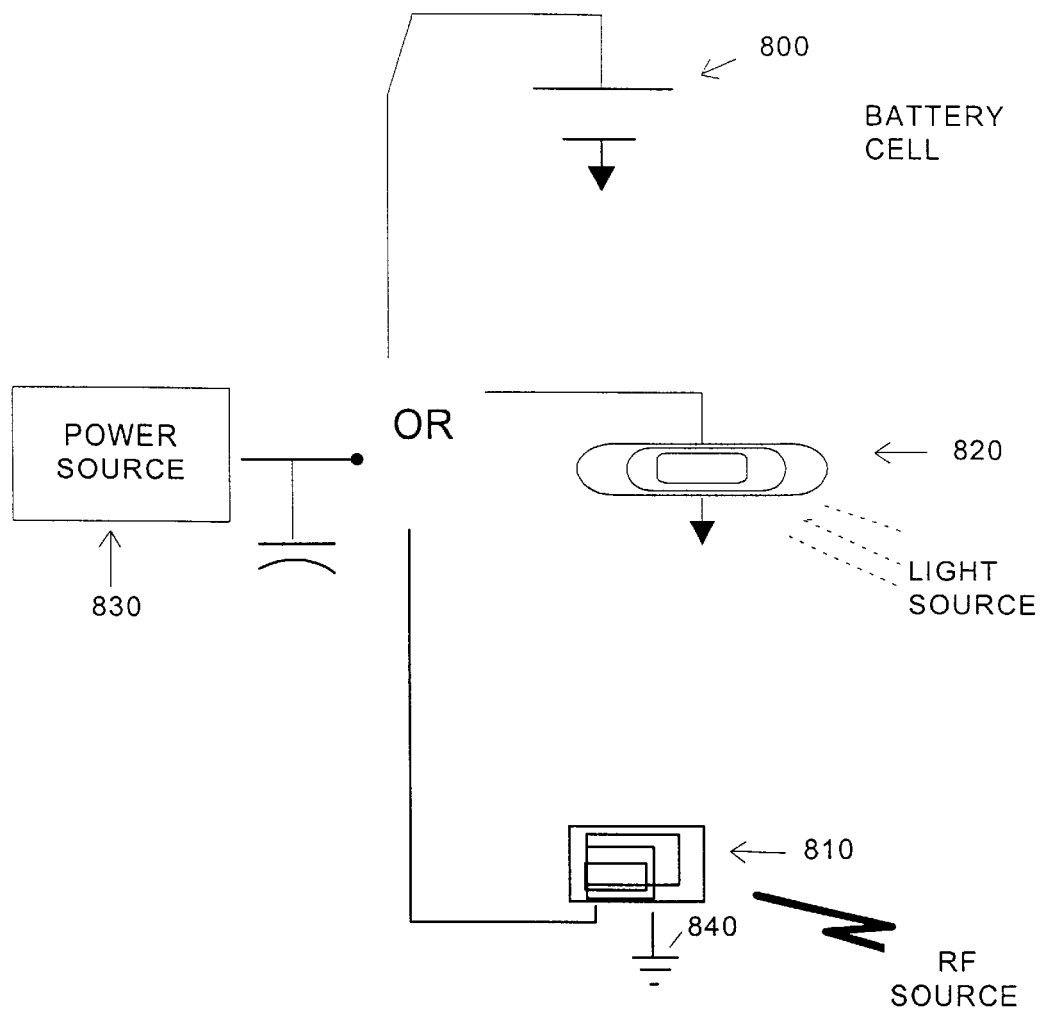
FIG. 8 is an enlarged block diagram of the power source shown in FIG. 5 illustrating power source options.

Referring to FIG. 8, the secure card's power 830 can be obtained from several sources. In the direct contact approach (not shown in FIG. 8) the problem is relatively simple as described above. All one needs is to provide the card reader with a compatible power source and a set of contacts to connect to the card. Similarly, a built-in battery cell (miniature button type) 800 could be packaged in the card body itself as shown in FIG. 8 to provide the necessary power. This approach is somewhat limited in durability since the cell would need to be replaced when exhausted. Packaging a replaceable cell in a thin card environment is somewhat expensive and requires inconvenient maintenance.

Another wireless power source approach is to use a burst of RF energy from the card reader to generate power on the card and temporarily store this energy in a built-in decoupling capacitor 840 in FIG. 8. This approach requires relatively efficient RF energy transfer from the reader to the card and some circuitry to rectify and translate the RF energy into a DC power source 810. A preferred approach for the card power source is to use semiconductor photocell 670 (FIG. 6B) and 820 to generate power when exposed to light. This is a relatively simple and inexpensive technology currently used in many low power electronic products. This approach renders the card fully autonomous, at a relatively low cost, and as convenient as currently used passive magnetic strip cards.

The security code generation is based on the concept that a properly configured LFSR can easily generate extremely large pseudo random binary sequences. Furthermore, these sequences can be customized by selecting a unique maximal length LFSR configuration. Another property of the LFSR machine is that if one knows the LFSR configuration, initial state or seed and the number of shift cycles one can easily calculate the final state of the LFSR. It is this property that allows a secure code to be transmitted and verified at the receiving end. FIG. 7 further depicts a secure code structure and associated code generation hardware. The function consists of two LFSRs 760 and 770 that shift synchronously with every oscillator clock after the card has been enabled and reset. In other words, the LFSR's count starts when the unit is activated and is incremented for each cycle at microsecond rates or faster. The top LFSR 760 is personalized with a unique maximal length configuration shown by block 730. This unique configuration is selected by the financial institution and written in the card at the time the card is issued. This is done by blowing e-fuses similar to the activation code personalization. This e-fusing process can also be done early in the chip manufacturing process.

The second LFSR 770 has a standard feedback configuration and is used to maintain synchronization with the LFSR 760 above. By knowing the final state and configuration of this reference LFSR 770 one can determine the number of shift cycles clocked by the free running oscillator 700. Now, if we introduce a random time interval that gates the LFSRs shift clock, we can generate pseudo random numbers by both LFSRs. The random time interval can be generated by the user from the time the card is powered on until the time it is fully activated. This random event typically takes several key touches to enter the activation characters and may be of the order of several seconds or more. If during this time we have a free running oscillator that toggles at megahertz (MHZ) rates or faster, the number of shifts the LFSRs make can become a very large random number. We can now generate the secure code by concatenating the card ID 780 and the states of the two LFSRs as shown in FIG. 7. The security code 790 is then continuously transmitted until the card automatically shuts down. This code can be read by the card reader during this time and are transmitted to the financial institution along with the desired transaction. Note that there is no need to send the activation code or pin number 795 with the security code. In addition to generating the security code, the synchronizing or reference LFSR can be used for automatically shutdown card power after a predetermined number of shift cycles. Automatic power down can be also implemented by a simple RC time constant circuit. Note also that the LFSR can be an integral part of the security code output shift register thereby minimizing circuit size and power consumption.

The secure concept previously described can be extended into many other applications besides the credit or debit cards. These may encompass special security cards, identification and access badges, phone cards, and other portable and personal instruments.

The extensive processing power of the integrated microprocessor and memory chips in conjunction with the card I/O described above, can be further extended to support complex two-way secure transactions. With robust security and communication issues resolved, the concept can easily interface with the Internet via a contact-less link to open a new communication path and access to innumerable new applications.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A secure card comprising:
   a card body which incorporates a microprocessor device, a read only memory device and a secure linear feedback shift register, the microprocessor device being interfaced to the read only memory device containing a pre-initialized personality configuration, said pre-initialized personality configuration being comprised of both a unique card identification and a customized secure linear feedback shift register initial configuration;
   a reference linear feedback shift register incorporated in said card body and synchronized to the secure linear feedback shift register;
   a security code generator incorporated in said card body and producing a security code utilizing said secure linear feedback shift register and said reference linear feedback shift register, said secure linear feedback shift register and said reference linear feedback shift register being driven by a common free running clock oscillator and providing outputs which, when combined with the card identification, produce a security code uniquely based upon said pre-initialized personality configuration, said security code being accessible by the microprocessor; and
   a communication interface incorporated in said card body and connected to said microprocessor device, said communication device providing an input/output message function of the secured information between the microprocessor and an agent outside the secure card body.

2. The secure card according to claim 1, wherein the read only memory is comprised of a plurality of integrated electronic fuses.

3. The secure card according to claim 1, wherein the initial configuration is pre-configured and permanently burned at card initialization to provide a unique linear feedback shift register sequence associated with the card and a sequence of sufficient length to provide for extremely large unique sequences.

4. The secure card according to claim 3, wherein the permanently burned initial configurations utilize electronic-fuse technology.

5. The secure card according to claim 1, wherein the security code generator produces a security code to uniquely identify the secure card by providing a synchronization key produced by the reference linear feedback shift register, a state of the secure linear feedback shift register, and a card identification at the time of card transaction authentication.

6. The secure card according to claim 1, wherein the communications interface is a contact interface whereby physical connections between the secure card and an external agent's input/output device provides a medium for exchanging information.

7. The secure card according to claim 1, wherein the communications interface is a contact-less interface whereby communications between the secure card and an external agent's input/output does not require physical contact with the secure card thus providing a medium for exchanging security code information.

8. The secure card according to claim 7, wherein the communications interface comprises a keypad of one or more keys and a display device said display device being a liquid crystal display or status indicator.

9. The secure card according to claim 1, wherein the secure card contains a power supply which is one or more semiconductor photo cells.

10. The secure card according to claim 1, wherein the secure card contains a power supply which is a wireless source using radio frequency energy.

11. The secure card according to claim 1, wherein the secure card also includes a magnetic strip, said magnetic strip containing card information.

* * * * *